United States Patent [19]
Hsieh

[11] Patent Number: 6,102,675
[45] Date of Patent: Aug. 15, 2000

[54] COOLING FAN WITH AN OIL-RETAINING BUSHING

[76] Inventor: Hsin-Mao Hsieh, No. 6, East Section, Chiao Nan Li, Industrial 6th Rd., Pingtung City, Pingtung Hsien, Taiwan

[21] Appl. No.: 09/225,519

[22] Filed: Jan. 6, 1999

[51] Int. Cl.⁷ .................................................. F04B 17/00
[52] U.S. Cl. ..................... 417/423.13; 184/5; 184/100; 384/322; 384/397
[58] Field of Search ........................... 417/423.13; 184/5, 184/5.1, 100, 98, 99; 384/322, 397, 907, 463, 410, 286, 291

[56] References Cited

U.S. PATENT DOCUMENTS

| | | | |
|---|---|---|---|
| 3,590,957 | 7/1971 | Campbell et al. | 184/99 |
| 3,705,753 | 12/1972 | Bierlein et al. | 384/291 |
| 4,861,237 | 8/1989 | Shiraki et al. | 417/423.7 |
| 5,093,599 | 3/1992 | Horng | 310/254 |
| 5,917,262 | 6/1999 | Huang et al. | 310/254 |

*Primary Examiner*—Charles G. Freay
*Assistant Examiner*—Cheryl J. Tyler
*Attorney, Agent, or Firm*—Thomas, Kayden, Horstemeyer & Risley LLP

[57] ABSTRACT

A cooling fan with an oil-retaining bushing has a rotor, a stator and a housing. A self-lubricating bushing is provided within the sleeve of the housing. The spindle of the rotor is disposed in a the bushing and fixed by a retaining ring. The bushings define an annual slot at each end thereof. A solid grease is applied into the annular slots. When the rotor rotates, the friction of the spindle and the bushings generates enough heat to melt the grease. The melted grease lubricates the spindle and the bushings to assure the smooth and even operation of the fan. Therefore, the useful life of the fan is lengthened.

3 Claims, 5 Drawing Sheets

COOLING FAN WITH AN OIL-RETAINING BUSHING

BACKGROUND OF THE INVENTION

1. Field of the Invention

The present invention relates to a cooling fan, and more particularly to a cooling fan with a self-lubricating bushing which can lengthen the bushing's useful life.

2. Description of Related Art

A cooling fan is commonly used to remove heat from an area. It is generally used for devices which will generate a lot of heat during operation, such as a computer, VHS, or duplicator.

A conventional cooling fan is partly shown in FIG. 7. The fan is constructed to have a rotor, a stator, a circuit board and a housing. The rotor has a spindle (80) with a groove (81) near the head of the spindle (80). A bushing (90) is mounted in a sleeve formed in the housing. The spindle (80) is inserted into the bushing (90), and the head extends out from the lower end of the bushing (90). A retaining ring (82) is attached into the groove (81) to fix the spindle (80) to the bushing (90). A lubricant seal (91) is disposed on the upper end of the bushing (90).

During operation, friction in the spindle (80) and the bushing (90) generates a lot of heat, so the lubricant in the bushing (90) will gradually be exuded from the seal (91) to lubricate the spindle (80) and the bushing (90).

However, after extended operation, the lubricant seal (91) loses its effectiveness due to consumption or drying of the lubricant. When this happens, the bushing or the spindle will be destroyed, and the fan will fail.

A cooling fan with a self-lubricating bushing in accordance with the present invention tends to mitigate and/or obviate the aforementioned problem.

SUMMARY OF THE INVENTION

The main object of the present invention is to provide a cooling fan which has a self-lubricating bushing to assure smooth and even operation.

Another object of the present invention is to provide a cooling fan with a bushing whose lubricant will not be completely consumed or dry out during the life of the equipment.

Other objects, advantages and novel features of the invention will become more apparent from the following detailed description when taken in conjunction with the accompanying drawings.

DETAILED DESCRIPTION OF THE PREFERRED EMBODIMENT

Figure 1:
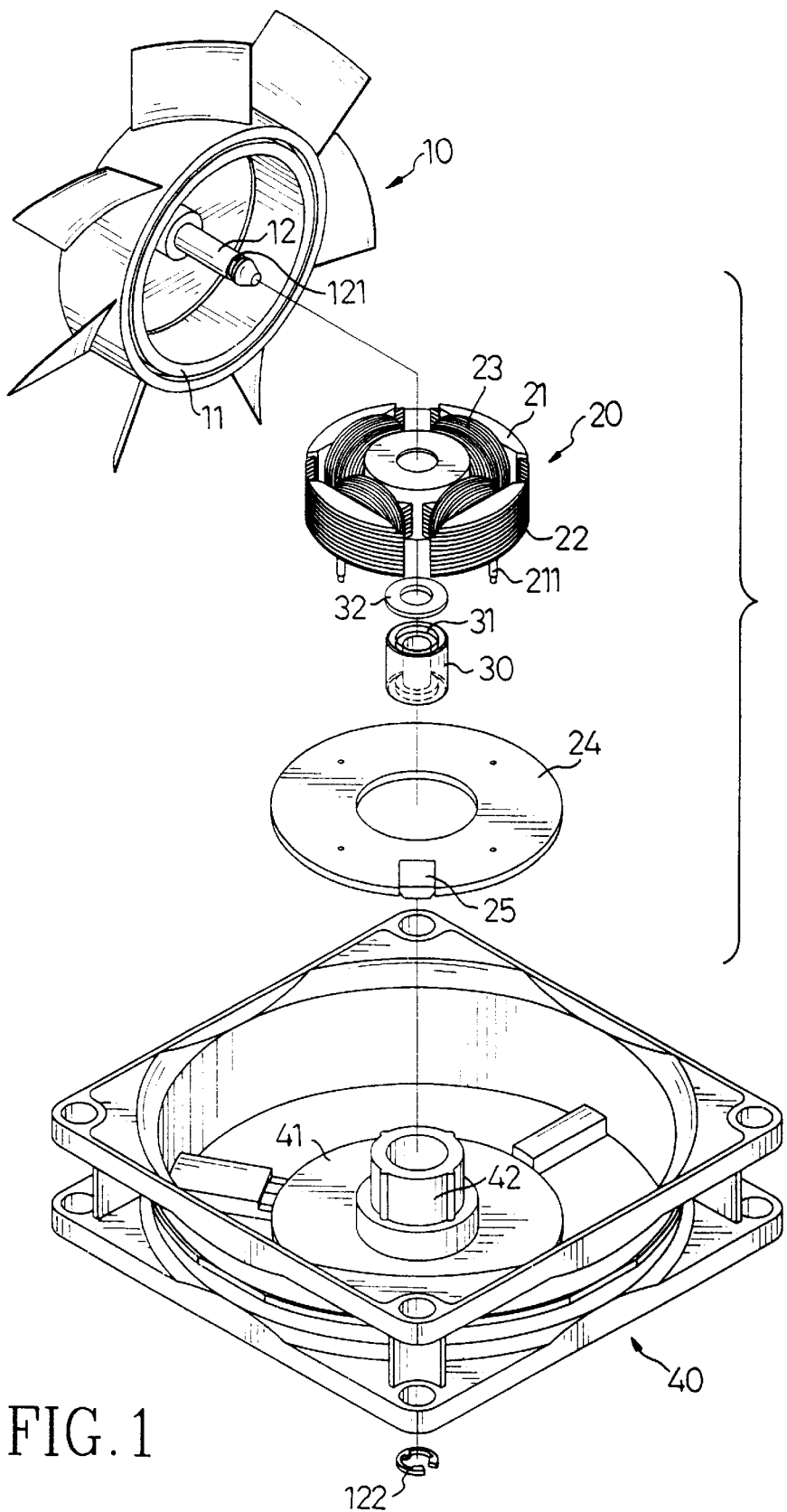
FIG. 1 is an exploded view of the present invention.
Figure 2:
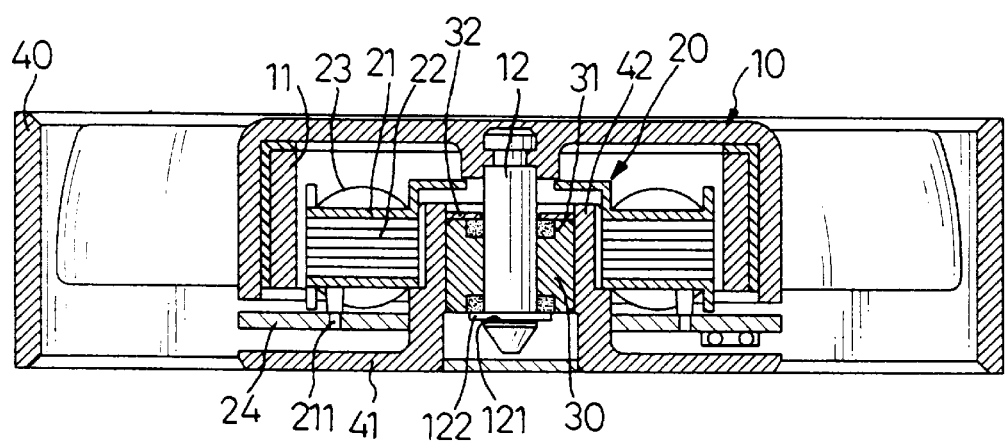
FIG. 2 is a side plan cross-section view of the present invention.

Referring to FIGS. 1 and 2, a fan of the present invention is constructed of a rotor (10), a stator (20) and a housing (40) receiving the rotor (10) and the stator (20) within.

The rotor (10) provides permanent magnets (11) in the internal wall thereof. A spindle (12) is formed in the center of the rotor (10). An annular groove (121) is formed near the head of the spindle (12).

The stator (20) comprises poles (21) formed from a plurality of laminar sheets (22).. Wire is wound around the poles (21) to form the windings (23). Mounting feet (211) are formed on the bottom of the poles (21). The feet (211) are disposed into positioning apertures (not numbered) of a circuit board (24) so as to mount the stator (20) on the circuit board (24). The circuit board (24) further forms a Hall inductor (25) which is located at a sensitive induction range to the laminar sheets (22).

The housing (40) forms a bottom plate (41) and a sleeve (42). The stator (20) is mounted on the sleeve (42). A bushing (30) is provided within the sleeve (42) and has a washer (32) disposed on the top thereof. The spindle (12) of the rotor (10) is inserted through the bushing (30), and the head of the spindle (12) extends out from the bushing (30). A retaining ring (122) is attached into the annular groove, so that the spindle (12) is fastened to the bushing (30). Then, the whole rotor (10) covers the stator (20) and can be rotated about it by the conventional electromagnetic effect when energized.

Figure 3:
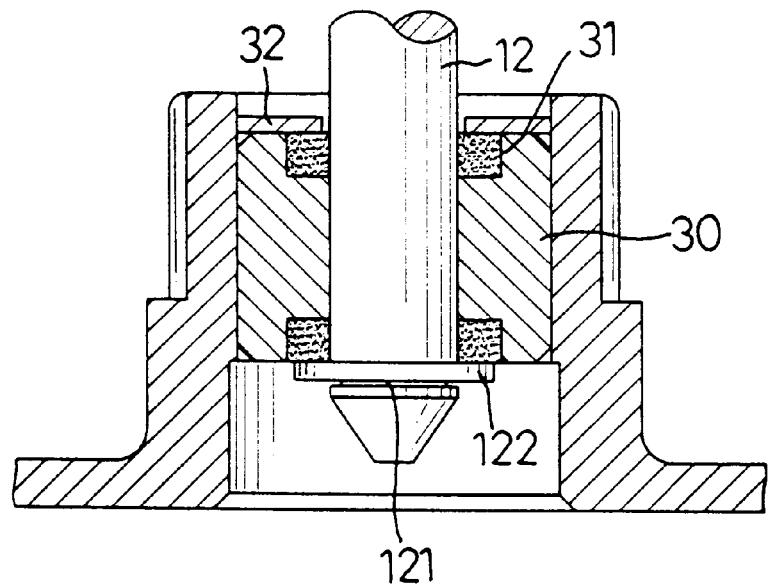
FIG. 3 is a side plan cross-section view of a first embodiment of the bushing of the present invention, wherein the bushing has rectangle annular slots.
Figure 4:
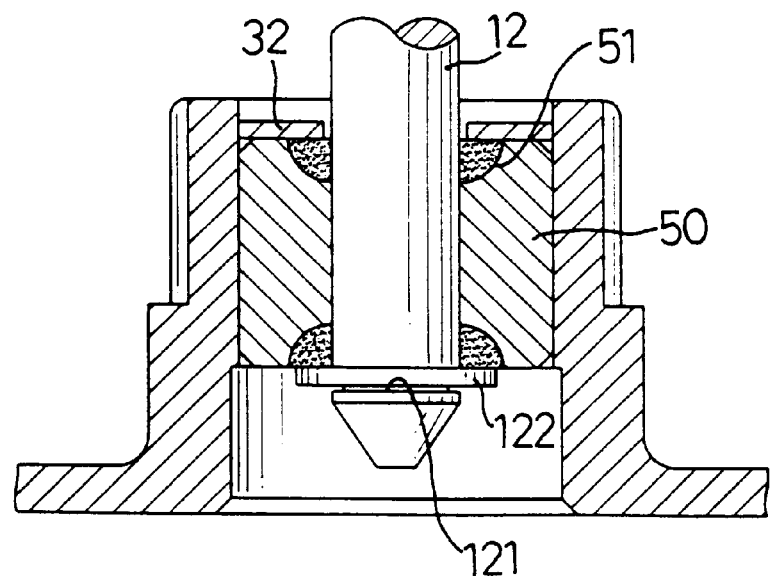
FIG. 4 is a side plan cross-section view of a second embodiment of the bushing of the present invention, wherein the bushing has arc annular slots.

The main improvement of the present invention is the configuration of bushing (30). Referring to FIG. 3, the bushing (30) respectively defines annular slots (31) in both ends thereof. The the annular slots (31) are rectangular. FIG. 4 shows another embodiment of the bushing (50), wherein the section of the annular slots (51) is an arc. A solid grease having a melting point is applied into the annular slots (31, 51).

When the spindle (12) rotates, the bushing (30) will generate a lot of heat, and the solid having a high melting point grease contained within the annular slots (31) will melt to lubricate the spindle (12) and the bushing (30). Therefore, the spindle (12) will run smoothly and uniformly. Because only the grease near the spindle (12) will melt, the melted lubricant will be blocked by the solid grease and can not leak out. The operation of the bushing (50) in FIG. 4 is the same as the bushing (30) in FIG. 1, 2 and 3.

Figure 5:
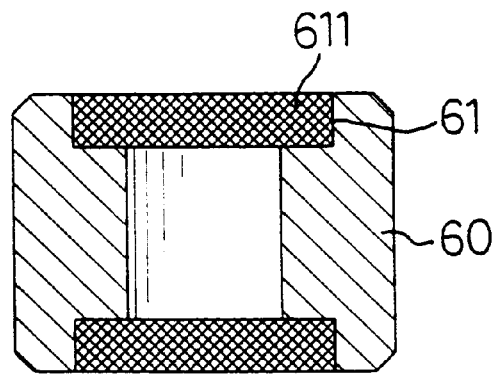
FIG. 5 is a side plan cross-section view of a third embodiment of the bushing of the present invention, wherein the rectangle annular slots of the bushing are embossed.
Figure 6:
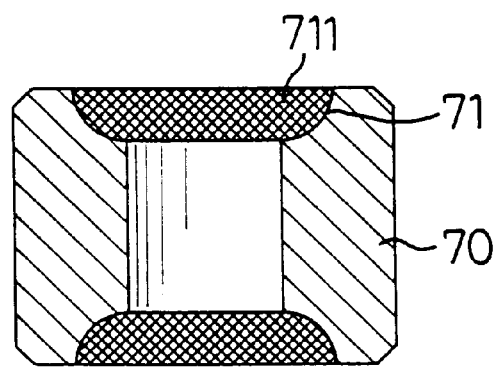
FIG. 6 is a side plan cross-section view of a fourth embodiment of the bushing of the present invention, wherein the arc annular slots of the bushing are embossed.
Figure 7:
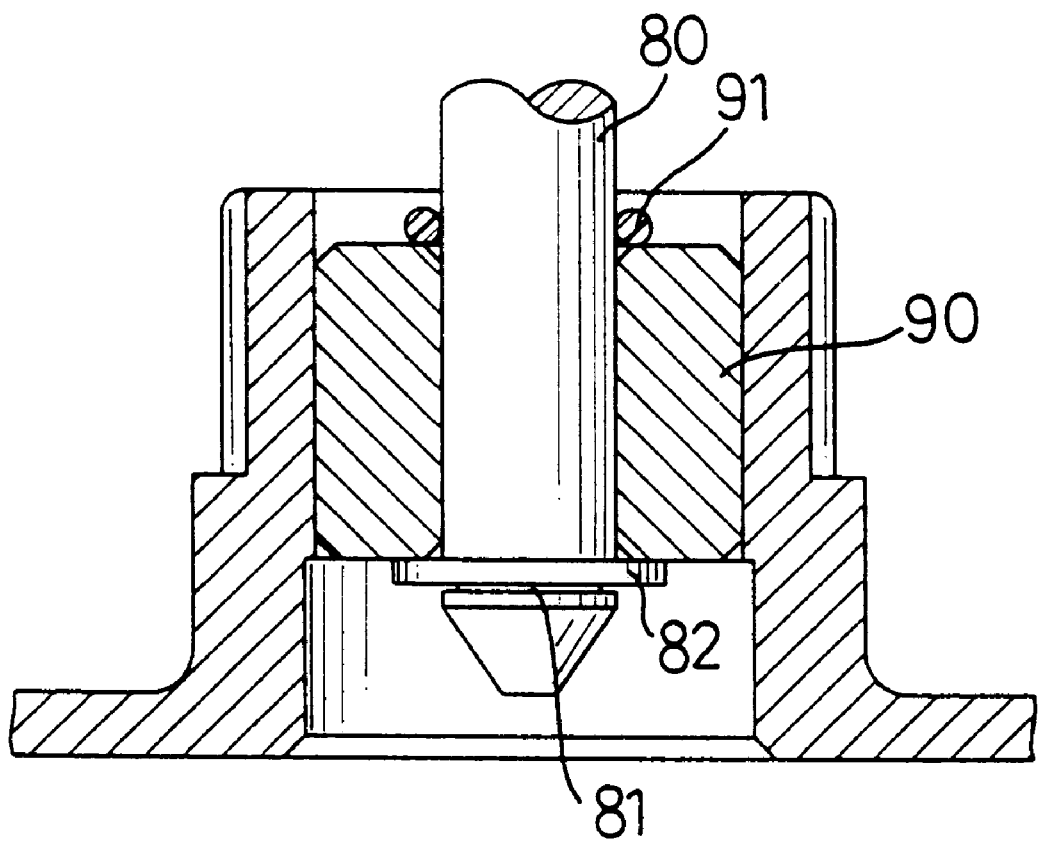
FIG. 7 is a side plan view in partial section of a conventional fan.

FIGS. 5 and 6 show two other embodiments of the bushing (60, 70). The bushings (60, 70) respectively define rectangle annular slots (61) and arc annular slots (71). The surface of the annular slots (61, 71) are embossed patterns (611, 711), so that the solid grease having a high melting point will adhere more securely.

The advantages of the present invention are:

1. As the grease applied into the annular slots is solid and has a high melting point, the melted lubricant will be blocked by the solid grease and can not leak out.

2. The spindle runs smoothly and uniformly due to the lubricating effect of the melted grease.

3. The useful life of the fan can be lengthened.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claim is:

1. A cooling fan comprising:

a housing having
- a sleeve formed on a bottom plate; and
- a bushing mounted within the sleeve, the bushing defining annular slots in each end of said bushing and having solid grease having a high melting point applied into said slots;

a stator fixed on the sleeve having a pole mounted on a circuit board;

a rotor having permanent magnets formed on the internal wall thereof and a spindle formed thereon, the spindle being mounted within the bushing;

the melting point of said solid grease being such that the spindle rotating within the bushing will generate heat to melt a portion of the grease thereby lubricating the spindle and the bushing; and each of said annular slots having an embossed surface pattern for retaining the solid portion of the grease within the slot.

2. The cooling fan as claimed in claim 1, wherein the cross section of at least one of said annular slots is a rectangle.

3. The cooling fan as claimed in claim 1, wherein the cross section of at least one of said annular slots is an arc.

* * * * *